United States Patent
Brusson et al.

(10) Patent No.: US 8,324,320 B2
(45) Date of Patent: Dec. 4, 2012

(54) BLENDS OF POLAR LOW DENSITY ETHYLENE COPOLYMERS AND POLY(HYDROXY CARBOXYLIC ACID)S

(75) Inventors: Jean-Michel Brusson, Montigny le Bretonneux (FR); Leen De Groof, Heverlee (BE)

(73) Assignee: Total Petrochemicals Research Feluy, Seneffe (feluy) (BE)

( * ) Notice: Subject to any disclaimer, the term of this patent is extended or adjusted under 35 U.S.C. 154(b) by 0 days.

(21) Appl. No.: 12/988,086

(22) PCT Filed: Apr. 16, 2009

(86) PCT No.: PCT/EP2009/054552
§ 371 (c)(1),
(2), (4) Date: Feb. 7, 2011

(87) PCT Pub. No.: WO2009/127700
PCT Pub. Date: Oct. 22, 2009

(65) Prior Publication Data
US 2011/0118414 A1    May 19, 2011

(30) Foreign Application Priority Data

Apr. 16, 2008 (EP) .................................. 08154642

(51) Int. Cl.
*C08L 67/04* (2006.01)
*C08L 31/04* (2006.01)
*C08J 5/18* (2006.01)
(52) U.S. Cl. ..................... 525/190; 525/411; 525/419
(58) Field of Classification Search ................ 525/191, 525/411, 419, 190
See application file for complete search history.

(56) References Cited

U.S. PATENT DOCUMENTS

| | | | |
|---|---|---|---|
| 7,947,754 B2 * | 5/2011 | Okuda et al. | ................. 521/134 |
| 2005/0151296 A1 | 7/2005 | Obuchi | |
| 2007/0213466 A1 | 9/2007 | Uradnisheck | |
| 2009/0023861 A1 * | 1/2009 | Shimakage et al. | ............ 525/89 |

FOREIGN PATENT DOCUMENTS

| | | |
|---|---|---|
| FR | 2902434 | 12/2007 |
| JP | 2008 080744 | 4/2008 |

* cited by examiner

*Primary Examiner* — Fred M Teskin (57) ABSTRACT

A resin composition comprising at least 0.1% by weight of poly(hydroxy carboxylic acid) and at least 50% by weight of polar low density polyethylene, the pLDPE comprising from 0.5 to 25% by weight of a polar vinyl-containing comonomer.

16 Claims, 2 Drawing Sheets

BLENDS OF POLAR LOW DENSITY ETHYLENE COPOLYMERS AND POLY(HYDROXY CARBOXYLIC ACID)S

CROSS-REFERENCE TO RELATED APPLICATIONS

This application claims the benefit of PCT/EP2009/054552, filed Apr. 16, 2009, which claims priority from EP 08154642.6, filed Apr. 16, 2008.

FIELD OF THE INVENTION

This invention is related to blends of poly(hydroxy carboxylic acid)s with polar low density ethylene copolymers (herein referred to as pLDPE). In particular, the invention is directed to blends comprising poly(lactic acid).

BACKGROUND OF THE INVENTION

In the past few years, the general public has become increasingly apprehensive of the impact man-made waste has on the environment. Hence there is a growing interest in developing novel biodegradable (and preferably compostable) plastics from renewable resources.

One particularly interesting candidate for this task is poly(hydroxy carboxylic acid), in particular poly(lactic acid) (PLA), now commercially available on a relatively large scale. The lactic acid is obtained from plants such as corn and sugar cane or other sugar-or starch-producing plants. Not only is PLA obtainable from renewable materials, it is also industrially compostable. For these reasons, there is significant interest in using PLA as a substitute in applications, where petroleum-based thermoplastics have conventionally been used.

Unfortunately, PLA used on its own does not have the same advantageous properties as conventional plastics do. In particular PLA has performance problems related to heat resistance, brittleness and limited flexibility, resulting in poor mechanical strength. On the other hand, polyolefins, such as polyethylene, have much better mechanical and rheological properties. It has been attempted to combine these properties by blending PLA with low density polyethylene (LDPE) to obtain a resin that is at least partially made of materials from renewable resources, but still has acceptable mechanical properties. In the past, compatibilising agents were used. However, this requires an additional industrial step, as well as specific conditions during extrusion. Furthermore, the addition of compatibilising agents is expensive and changes the properties of the desired product. Thus both the compatibilising agent and the by-products change the properties of the desired end product, be it a film, fiber or moulded object.

There are various examples in the prior art where attempts have been made to blend certain polyolefins with PLA.

EP 1 777 263 A also teaches mixing polyolefins with PLA by using a compatibiliser, wherein the compatibiliser is a hydrogenated, diene-based polymer containing at least one functional group selected from carboxyl group, acid anhydride group, epoxy group, (meth)acryl group, amino group, alkoxysilyl group, hydroxyl group, isocyanate group and oxazoline group. The polyolefin is a polymer obtained by polymerizing ethylene and/or at least one kind of alpha-olefin using either the high-pressure method or the low-pressure method. Examples of the alpha-olefin includes alpha-olefins of 3 to 12 carbon atoms, such as propylene, 1-butene, 1-pentene, 3-methyl-1-butene, 1-hexene, 3-methyl-1-pentene, 4-methyl-1-pentene, 3-ethyl-1-pentene, 1-octene, 1-decene, 1-undecene and the like.

US 2005/0192405 A discloses a polymer alloy of PLA and polyolefins. The two components are made miscible by including a polyalkylacrylic ester and/or a polyvinyl ester, as well as a block copolymer of a polyalkylacrylic ester and a polyolefin and/or a block copolymer of a polyvinyl ester and a polyolefin. The polyolefin described is either a polyethylene obtained by a radical polymerisation mechanism or a polyethylene or polypropylene obtained via cationic addition polymerisation mechanisms using Ziegler-Natta catalysts.

Each of these prior arts demonstrates the requirement of compatibilisers to obtain acceptably homogeneous blends of polyolefins with PLA.

JP 2007 063435 A discloses blending PLA with polyethylene comprising vinyl acetate comonomer, also known as EVA. However, the content of vinyl acetate monomer is at least 30 wt %.

U.S. Pat. No. 5,726,220 discloses a blend of PLA and EVA, wherein EVA comprises at least 30 wt % of vinyl acetate comonomer.

The problem with the blends in these pieces of prior art is that the polyethylenes have a high content of vinyl acetate comonomer. The advantageous properties of polyethylene are lost, because as the content of vinyl acetate increases, EVA becomes more and more elastic and less and less crystalline. Transparency increases, but so does its permeability to gas, moisture and oils. On the other hand, if it were possible to achieve homogeneous blends of PLA with an EVA comprising less than 25 wt %, and in particular less than 20 wt % of vinyl acetate comonomer, these would provide much tougher, more resilient resin compositions.

It is thus an object of the invention to develop a resin, which is at least partially obtainable from renewable resources, and has better mechanical properties than hitherto known blends of polyethylene with resins obtainable from renewable resources.

It is additionally an object of the invention to develop a resin, which is at least partially obtainable from renewable resources, but has higher stiffness than pLDPE (e.g. EVA) resin.

It is also an object of the invention to develop a resin, which is at least partially obtainable from renewable resources, and has better mechanical properties than poly(hydroxy carboxylic acid) resins.

Furthermore, it is an object of the invention to blend LDPE with poly(hydroxy carboxylic acid)s, such as PLA, without having to use additional compatibilising agents to obtain homogeneous blends.

It is further an object of the invention to develop a resin that has better gas barrier properties than LDPE.

It is also an object of the invention to develop a resin with better surface tension properties than LDPE.

It is also an object of the invention to find a resin at least partially obtainable from renewable resources that can be used in blown, extrusion, cast and/or coextruded films.

At least one of the above objects is achieved with the implementation of the current invention.

SUMMARY OF THE INVENTION

The present invention solves at least one of the problems mentioned above by providing a resin composition comprising at least 0.1% by weight and less than 50% by weight of poly(hydroxy carboxylic acid) and at least 50% by weight of polar low density polyethylene (pLDPE), the pLDPE comprising from 0.5 to 25% by weight of a polar comonomer.

Preferably, the comonomer is selected from one or more of: vinyl esters, alkyl and cycloalkyl acrylates, alkyl and cycloalkyl methacrylates, alkyl and cycloalkyl ethyl acrylates, unsaturated dicarboxylic acids, and unsaturated dicarboxylic acid derivatives.

The invention also covers the process for making the resin composition of the present invention, wherein the poly(hydroxy carboxylic acid) is blended with the pLDPE.

It also covers the use of poly(hydroxy carboxylic acid)s in pLDPE-based blends and the uses of the blends in films, thermoforming, in foaming applications, heat seal applications, blow moulding, injection and/or stretch blow moulding, extrusion blow moulding, rotational moulding and in blends with other resins. The blends can also be used as a surface tension modifier in films to improve printability, to improve the gas barrier properties of pLDPE, to improve the water breathability of pLDPE, in particular where the pLDPE is ethylene-vinyl acetate (EVA) copolymer.

DETAILED DESCRIPTION OF THE INVENTION

As described above, the present invention relates to a composition comprising a resin blend of poly(hydroxy carboxylic acid) and polar low density ethylene copolymer pLDPE.

Surprisingly, blends of poly(hydroxy carboxylic acid)s with low density polyethylene comprising polar comonomers are sufficiently homogeneous and provide unexpectedly acceptable properties. They can be obtained by using an LDPE with a polar comonomer content of 25 wt % or less.
The Poly(Hydroxy Carboxylic Acid)

The poly(hydroxy carboxylic acid) can be any polymer wherein the monomers are derived from renewable resources and comprise at least one hydroxyl group and at least one carboxyl group. The hydroxy carboxylic acid monomer is preferably obtained from renewable resources such as corn and sugar cane or other sugar-or starch-producing plants. Preferably the poly(hydroxy carboxylic acid) used according to the invention is obtained from renewable resources. The term "poly(hydroxy carboxylic acid)" includes homo-and co-polymers herein and blends of one or more such polymers.

The poly(hydroxy carboxylic acid) can be represented as in Formula I:

Formula I wherein
$R_9$ is hydrogen or a branched or linear alkyl comprising from 1 to 12 carbon atoms;
$R_{10}$ is optional and can be a branched, cyclic or linear alkylene chains comprising from 1 to 12 carbon atoms; and
"r" represents the number of repeating units of R and is any integer from 30 to 15000.

The monomeric repeating unit is not particularly limited, as long as it is aliphatic and has a hydroxyl residue and a carboxyl residue. Examples of possible monomers include lactic acid, glycolic acid, 3-hydroxybutyric acid, 4-hydroxybutyric acid, 4-hydroxyvaleric acid, 5-hydroxyvaleric acid and 6-hydroxycaproic acid to make for example poly(lactic acid), poly(glycolic acid), poly(3-hydroxybutyric acid), poly(4-hydroxybutyric acid), poly(4-hydroxyvaleric acid), poly(5-hydroxyvaleric acid) and poly(6-hydroxycaproic acid), respectively.

The monomeric repeating unit may also be derived from a cyclic monomer or cyclic dimer of the respective aliphatic hydroxycarboxylic acid. Examples of these include lactide, glycolide, β-propiolactone, β-butyrolactone, γ-butyrolactone, γ-valerolactone, δ-valerolactone, ε-caprolactone and the like.

In the case of asymmetric carbon atoms within the hydroxy carboxylic acid unit, each of the D-form and the L-form as well as mixtures of both may be used. Racemic mixtures can also be used.

The poly(hydroxy carboxylic acid) may optionally comprise one or more comonomer(s).

The comonomer can be a second different hydroxycarboxylic acid as defined above in Formula I. The weight percentage of each hydroxycarboxylic acid is not particularly limited.

The comonomer can also comprise dibasic carboxylic acids and dihydric alcohols. These react together to form aliphatic esters, oligoesters or polyesters as shown in Formula II having a free hydroxyl end group and a free carboxylic acid end group, capable of reacting with hydroxy carboxylic acids, such as lactic acid and polymers thereof.

Formula II wherein
$R_{11}$ and $R_{12}$ are branched or linear alkylenes comprising from 1 to 12 carbon atoms and can be the same or different;
"t" represents the number of repeating units T and is any integer of at least 1

These copolymers are also within the scope of the invention. The sum of the number of repeating units "r" (Formula I) and "t" (Formula II) is any integer from 30 to 15000. The weight percentages of each monomer i.e. the hydroxycarboxylic acid monomer and the aliphatic ester, oligoester or polyester comonomer of Formula II are not particularly limited. Preferably, the poly(hydroxy carboxylic acid) comprises at least 50% by weight (wt %) of hydroxycarboxylic acid monomers and at most 50 wt % of aliphatic ester, oligoester or polyester comonomers.

The dihydric alcohols and the dibasic acids that can be used in the aliphatic polyester unit as shown in Formula II are not particularly limited. Examples of possible dihydric alcohols include ethylene glycol, diethylene glycol, triethyleneglycol, propylene glycol, dipropylene glycol, 1,3-butanediol, 1,4-butanediol, 3-methyl-1,5-pentanediol, 1,6-hexanediol, 1,7-octanediol, 1,9-nonanediol, neopentyl glycol, 1,4-cyclohexanediol, isosorbide and 1,4-cyclohexane dimethanol and mixtures thereof.

Aliphatic dibasic acids include succinic acid, oxalic acid, malonic acid, glutaric acid, adipic acid, pimelic acid, suberic acid, azelaic acid, sebacic acid; undecanoic diacid, dodecanic diacid and 3,3-dimethylpentanoic diacid, cyclic dicarboxylic acids such as cyclohexanedicarboxylic acid and mixtures thereof. The dibasic acid residue in the hydroxy carboxylic acid copolymer can also be derived from the equivalent diacylchlorides or diesters of the aliphatic dibasic acids.

In the case of asymmetric carbon atoms within the dihydric alcohol or the dibasic acid, the D-form and the L-form as well as mixtures of both may be used. This includes the possibility of using racemic mixtures.

The copolymer can be an alternating, periodic, random, statistical or block copolymer.

Polymerisation can be carried out according to any method known in the art for polymerising hydroxy carboxylic acids. Polymerisation of hydroxy carboxylic acids and their cyclic dimers is carried out by polycondensation or ring-opening polymerisation, respectively.

Copolymerisation of hydroxycarboxylic acids can be carried out according to any method known in the art. The hydroxycarboxylic acid can be polymerised separately prior to copolymerisation with the comonomer or both can be polymerised simultaneously.

In general, the poly(hydroxy carboxylic acid), homo-or copolymer (copolymerised with a second different hydroxy carboxylic acid or with an aliphatic ester or polyester as described above), may also comprise branching agents. These poly(hydroxy carboxylic acid)s can have a branched, star or three-dimensional network structure. The branching agent is not limited so long as it comprises at least three hydroxyl groups and/or at least three carboxyl groups. The branching agent can be added during polymerisation. Examples include polymers such as polysaccharides, in particular cellulose, starch, amylopectin, dextrin, dextran, glycogen, pectin, chitin, chitosan and derivates thereof. Other examples include aliphatic polyhydric alcohols such as glycerine, pentaerythritol, dipentaerythritol, trimethylolethane, trimethylolpropane, xylitol, inositol and the like. Yet another example of a branching agent is an aliphatic polybasic acid. Such acids include cyclohexanehexacarboxylic acid, butane-1,2,3,4-tetracarboxylic acid, 1,3,5-pentane-tricarboxylic acid, 1,1,2-ethanetricarboxylic acid and the like.

The total molecular weight of the poly(hydroxy carboxylic acid) depends on the desired mechanical and thermal properties of the final resin composition. It is preferably from 5,000 to 1,000,000 g/mol, more preferably from 10,000 to 500,000 g/mol and even more preferably from 35,000 to 200,000 g/mol. Most preferably the total molecular weight of the polymer is from 50,000 to 150,000 g/mol.

The molecular weight distribution is generally monomodal. However, in the case of mixtures of two or more fractions of poly(hydroxy carboxylic acid)s of different weight average molecular weight and/or of different type, the molecular weight distribution can also be multimodal e.g. bi-or trimodal.

From a standpoint of availability, transparency, renewability of the primary resource and compostability, the poly(hydroxy carboxylic acid) is preferably a poly(lactic acid) (PLA). Preferably, the poly(lactic acid) is a homopolymer obtained either directly from lactic acid or from lactide, more preferably from lactide.

Thus, preferably, the poly(hydroxy carboxylic acid) that is selected is obtained from renewable resources, more preferably it is additionally compostable. For example, PLA is both obtainable from renewable resources and it is compostable under industrial conditions.

The Polyethylene

The term "low density polyethylene" (LDPE) is defined herein as a polyethylene having a density of from 0.915 g/cm$^3$ up to 0.935 g/cm$^3$, obtained by radically polymerising ethylene under high pressure i.e. from 400 to 4500 bar and at temperatures of from 120 to 330° C. Polymerisation is normally carried out using an initiator, for example, a peroxide. LDPE's density is low due to the presence of a high degree of long and short chain branching. It has unique flow properties, allowing it to be easily processed. However, the crystal structure of LDPE is not packed tightly and the inter-and intramolecular forces are weak. As a result, properties such as tensile strength, environmental stress crack resistance (ESCR) and tear resistance are lower in LDPE than in low-pressure catalysed linear low density polyethylene (LLDPE). Yet, these properties are still higher than those of the poly(hydroxy carboxylic acid)s.

To obtain the low density polyethylene used in the invention i.e. pLDPE, the ethylene is polymerised at high pressure with one or more comonomers selected from the following:
  acrylates such as acrylic acid, methyl acrylate, ethyl acrylate, n-butyl acrylate, 2-ethylhexyl acrylate and tert-butyl acrylate;
  methacrylic acid, methyl methacrylate, ethyl methacrylate, n-butyl methacrylate and tert-butyl methacrylate;
  ethyl acrylic acid, methyl ethyl acrylate, diethyl acrylate, n-butyl ethyl acrylate and tert-butyl ethyl acrylate;
  vinyl esters, vinyl acetate being particularly preferred;
  unsaturated dicarboxylic acids, particularly preferably maleic acid;
  unsaturated dicarboxylic acid derivatives, particularly preferably maleic anhydride and alkylimides of maleic acid, for example N-methylmaleimide.

According to the invention, the pLDPE has from 0.5 up to 25 wt % of a polar comonomer comprising a polymerisable carbon-carbon double bond.

These comonomers impart on the LDPE slightly polar properties. The pLDPE is thus a polymer, which is more polar than LDPE. Surprisingly, even with weight percentages of the polar comonomer as low as 25 wt % and even lower, the two components i.e. the poly(hydroxy carboxylic acid) and the pLDPE, can be easily mixed to form a homogeneous blend. No compatibiliser is required for this purpose. Most preferably, pLDPE is an ethylene-vinyl acetate (EVA) polymer, the comonomer being vinyl acetate.

Preferably, the comonomer content of the pLDPE does not exceed 25 wt % of the ethylene copolymer. More preferably, it does not exceed 20 wt %. Preferably, the comonomer content is at least 0.5 wt %, most preferably 1 wt % of the ethylene copolymer. More preferably, it is at least 5 wt % and most preferably, the comonomer content is at least 10 wt % of the polar ethylene copolymer.

Additionally, additives can be included in one or more components of the blend, they can be added during blending, and/or they can be included in a product formed from the blend, such as a film, as desired. Such additives are well known in the art, and can include, for example: antioxidants (e.g. hindered phenolics such as IRGANOX™ 1010 or IRGANOX™ 1076 available from Ciba™); phosphites (e.g. IRGAFOS™ 168 available from Ciba™); anti-cling additives; tackifiers; such as polybutenes, terpene resins, aliphatic and aromatic hydrocarbon resins, alkali metal and glycerol stearates and hydrogenated rosins; UV stabilizers; heat stabilizers; anti-blocking agents; release agents; anti-static agents; pigments; colorants; carbon black; dyes; waxes; silica; fillers; talc, anti-acid compounds; peroxides; grafting agents; lubricants; clarifying agents; nucleating agents and the like.

Blending of Poly(Hydroxy Carboxylic Acid) with the Polyethylene

The blending of poly(hydroxy carboxylic acid) with the pLDPE of the invention can be carried out according to any physical blending method and combinations thereof known in the art. This can be, for instance, dry blending, wet blending and/or melt blending. The blending conditions depend upon the blending technique and pLDPE involved. Depending on the method, the pLDPE and the poly(hydroxy carboxylic acid) can be in any appropriate form, for example, fluff, powder, granulate, pellet, solution, slurry, and/or emulsion.

If dry blending of the polymer is employed, the dry blending conditions may include temperatures from room temperature up to just under the melting temperature of the polymer. The components can be dry blended prior to a melt blending stage.

Melt processing is fast and simple and makes use of standard equipment of the thermoplastics industry. The components can be melt blended in a batch process such as with a Banbury or Brabender Mixer or in a continuous process, such as with a typical extruder e.g. a twin screw extruder. During melt blending, the temperature at which the polymers are combined in the blender will generally be in the range between the highest melting point of the polymers employed and up to about 150° C. above such melting point, preferably between such melting point and up to 100° C. above such melting point. The time required for the melt blending can vary broadly and depends on the method of blending employed. The time required is the time sufficient to thoroughly mix the components. Generally, the individual polymers are blended for a time of about 10 seconds up to about 10 minutes, preferably up to about 5 minutes, more preferably up to about 2 minutes.

The components can also be wet blended whereby at least one of the components is in solution or slurry form. If solution blending methods are employed, the blending temperature will generally be 25° C. to 50° C. above the cloud point of the solution involved. The solvent or diluent is then removed by evaporation to leave behind a homogeneous blend of poly (hydroxy carboxylic acid) and the pLDPE.

According to an embodiment, the resin composition comprises at least 0.1 wt % and less than 50% by weight of poly(hydroxy carboxylic acid) and at least 50% by weight of pLDPE, preferably more than 50% by weight of pLDPE.

More preferably, the resin composition comprises from 0.1 to 49.9 wt % of poly(hydroxy carboxylic acid), preferably from 0.1 to 30 wt %, more preferably from 0.1 to 20 wt %, even more preferably from 0.1 to 15 wt % and most preferably from 0.1 to 10 wt %. The resin composition comprises from 50 to 99.9 wt % of the pLDPE, preferably from 70 to 99.9 wt %, more preferably from 80 to 99.9 wt even more preferably from 85 to 99.9 wt % and most preferably from 90 to 99.9 wt %.

Preferably, the resin composition essentially consists of the pLDPE and poly(hydroxy carboxylic acid) i.e. at least 0.1 and less than 50 wt % of poly(hydroxy carboxylic acid) and 50 to 99.9 wt % of the pLDPE.

In preferred embodiment according to the invention, the composition does not require compatibiliser for compatibilising pLDPE and poly(hydroxy carboxylic acid) i.e. it is free of compatibilisation agents.

The resin composition according to the invention can also be used in blends with other resin compositions to be used in the same applications as mentioned in the following section.

Compostability is herein defined as provided by the standard EN 13432:2000. In order for packaging material to be biodegradable it must have a lifecycle, which can be described as follows:
- a period of storage and/or use starting from time $t_0$, which is the moment the material comes off the production line;
- a period of disintegration starting at time $t_1$, during which the polymer begins to significantly chemically disintegrate e.g. via the hydrolysis of ester bonds;
- a period of biodegradation, during which the partly hydrolysed polymer biologically degrades as a result of the action of bacteria and micro organisms;

It is important to make the distinction between degradable, biodegradable and compostable as often these terms are used interchangeably. In addition to the above, a compostable plastic is "capable of undergoing biological decomposition in a compost site as part of an available program, such that the plastic is not visually distinguishable and breaks down to carbon dioxide, water, inorganic compounds, and biomass, at a rate consistent with known compostable materials (e.g. cellulose) and leaves no toxic residue" (ASTM definition). On the other hand a degradable plastic is one which is merely chemically changed i.e. there is no requirement for the plastic to be biologically degraded by microorganisms. Therefore, a degradable plastic is not necessarily biodegradable and a biodegradable plastic is not necessarily compostable (that is, it breaks down too slowly and/or leaves toxic residue).

In particular, the EN 13432:2000 standard for compostability has the following main features:
- Disintegration is measured by sieving the material to determine the biodegraded size. To be considered compostable, less than 10% of the material should be larger than 2 mm in size.
- Biodegradability is determined by measuring the amount of carbon dioxide produced over a certain time period by the biodegrading plastic. To be considered compostable, it must be 90% biodegraded within 90 days.
- Eco-toxicity is measured by determining whether the concentration of heavy metals is below the limits set by the standard and by testing plant growth by mixing the compost with soil in different concentrations and comparing it with controlled compost.

Applications of the Resin Composition

Due to the improved mechanical properties of the resin composition stemming from the presence of the low density ethylene copolymer, as well as the partial renewability of the material and compostability of the resin composition resulting from the presence of poly(hydroxy carboxylic acid), it is suitable for a wide variety of applications, including films, and moulding applications, as described below.

The resin composition is particularly suitable for transformation into a film, for example cast, blown, uni-oriented and bi-oriented film. It has been surprisingly found that films formed from polymer blends of the invention exhibit increased tensile strengths relative to films of LDPE according to the invention. Films comprising the resin composition of the invention have improved printability in comparison to films consisting only of low density ethylene copolymer due to the higher surface tension of poly(hydroxy carboxylic acid)s, like PLA. The films according to the invention also have increased thermal and high frequency sealability in comparison to LDPE films. The presence of poly(hydroxy carboxylic acid)s also increases the stiffness of the film and provides enhanced water breathability in comparison to LDPE films. The films of the invention also have improved barrier properties against atmospheric gases, in particular oxygen, carbon dioxide and nitrogen in comparison to films consisting solely of PLA.

The polymer blends of the invention can be used to form cast or blown films having a single layer (monolayer films) or multiple layers (multilayer films). When used in multilayer films, the polymer blends according to the invention can be used in any layer of the film, or in more than one layer of the film, as desired. When more than one layer of the film is formed using a polymer blend of the present invention, each such layer can be individually formulated, i.e. the layers formed can be the same or different in chemical composition, density, melt index, thickness and so on, depending upon the desired properties of the film. The other layer(s) can include resins made of 100% poly(hydroxy carboxylic acid), for example PLA, 100% polyethylene, for example high-pressure polymerised low-density polyethylene (LDPE), LLDPE, MDPE or HDPE. Further, one skilled in the art will understand that the layers of a multilayer film must have the appropriate viscosity match.

The thickness of each layer of the film and of the overall film, are not particularly limited, but are determined according to the desired properties of the film. Typical film layers have a thickness of about 1 to 1000 μm, more typically about 5 to 100 μm, and typical films have an overall thickness of 5 to 200 μm, more typically 5 to 100 μm.

Preferably, the present invention provides a single-layer (monolayer) film formed of any of the polymer blends of the invention. According to another embodiment this film is 10 to 150 μm thick.

The films of the present invention may be formed by any number of well-known extrusion or coextrusion techniques. Any of the blown or chill roll techniques commonly used are suitable. For example, the composition can be extruded in a molten state through a flat die and then cooled to form a film. Alternatively, the composition can be extruded in a molten state through an annular die and then blown and cooled to form a tubular, blown film, which can then be axially slit and unfolded to form a flat film.

As a specific example, cast films can be prepared using a pilot scale commercial cast film line machine as follows. Pellets of the polymeric blend are melted at temperatures ranging from about 220° C. to about 250° C., with the specific melt temperature being chosen to match melt viscosities of the various resins. The flow is then extruded through a single manifold film extrusion die to the desired width. The die gap opening is typically from 250 to 750 μm, preferably about 600 μm. The material is then drawn down to the final gauge. A vacuum box or air knife can be used to pin the melt exiting the die opening to a primary chill roll maintained at less than 35° C., preferably at about 32° C.

As another example, blown films can be prepared as follows. The film can be for instance produced using a Collin blown film line using a die with a die gap of 1.0-2.0 mm, preferably 1.2 mm, a die diameter of 1-100 mm, preferably 50 mm and a length to diameter ratio of 25. The blow-up ratio (BUR) can range from 1.0 to 10.0, preferably from 1.0 to 5.0, most preferably from 1.3 to 3.5. The film can then be extruded through the die into a film and cooled, for example by blowing air onto the surface of the film. In industrial processes, the film is then preferably drawn from the die to form a cylindrical film that is cooled, collapsed and optionally subjected to a desired auxiliary process, such as slitting, treating, sealing or printing. The finished film can be wound into rolls for later processing and converting.

Multiple-layer films may be formed by methods well known in the art. The materials forming each layer may be coextruded through a coextrusion feedblock and die assembly to yield a film with two or more layers adhered together but differing in composition. Coextrusion can be adapted to the cast film or the blown film processes. Multiple-layer films may also be formed by extrusion coating, whereby a substrate material is contacted with the hot molten polymer as the polymer exits the die.

There are many potential applications for the films produced from the polymer blends described herein. These films can be made into other forms, such as tape, by any one of a number of well-known cutting, slitting, and/or rewinding techniques. They may be useful as stretch, sealing, or oriented films.

Surface tension of the film made from the blend is already improved in relation to polyethylene films. However, the surface tension of the films made with the resin composition of the invention can be increased even further by modifications known in the art, such as corona discharge, various chemical treatments, flame treatments and the like.

Films according to the invention can be used as cling films, stretch films, shrink films, shipping sacks, bags, lamination films, liners, diaper films, candy wrappers or for a variety of other suitable end-use applications that will be apparent to those skilled in the art. The films can also be applied in packaging material, such as for bundling and unitizing a variety of products; flexible food packaging, including frozen food packaging; bags, such as trash bags and bin liners, industrial liners, shipping sacks and produce bags; and surface protection applications, with or without stretching, such as in the temporary protection of surfaces during manufacturing or transportation.

The composition is also suitable for typical injection, extrusion, extrusion blow moulding, stretch blow moulding and injection stretch blow moulding applications, but also thermoforming, foaming and rotomoulding applications. The articles made according to these processes can be mono-or multilayer, at least one of the layers comprising the resin composition of the invention.

The following are non-limiting examples illustrating the invention.

EXAMPLES

Two blends comprising 20% by weight of PLA Terramac® 6201 and 80% by weight of different polyethylenes were made by dry blending the two components, followed by extrusion at a temperature of 180° C. for about 30 minutes. Blend "A" was made with 80% by weight of an ethylene-vinyl acetate copolymer (EVA) and blend "B" with 80% by weight of a high-pressure polymerised LDPE without comonomer.

The properties of the individual components of each blend are provided in Table 1.

TABLE 1

|  | EVA | LDPE | PLA |
|---|---|---|---|
| Density/g/cm$^3$ | N/A | 0.924 | 1.26 at 23° C. |
| Melt index MI2/ g/10 min | 0.75 | 0.8 | 9-10 at 233 ppm H$_2$O 18-20 at 1000 ppm H$_2$O |
| MW/da | 80000 | 90000 | 106940 |
| MWD | 4.5 | 5.4 | 1.75 |
| CH$_3$/1000 C. | N/A | 23.7 | N/A |

TABLE 1-continued

|  | EVA | LDPE | PLA |
|---|---|---|---|
| Vinyl acetate comonomer/wt % | 17 | N/A | N/A |

N/A = not applicable

Densities of the polyethylenes and the PLA were measured according to ASTM D 1505. Melt indices MI2 for the polyethylenes were measurable according to ASTM D 1238, i.e. at 190° C. using a load of 2.16 kg, and according to the same standard for PLA, except the measurements were carried out once in the presence of 233 ppm water and once in the presence of 1000 ppm water.

MW and MWD for PLA and the polyethylenes were determined, using GPC, where the PLA was dissolved in chloroform and measurements were taken at 25° C.

Short chain branching indices of $CH_3$ and $C_4H_9$ of polyethylene were assessed using NMR. Hexene comonomer weight percentage of the metallocene-catalysed polyethylene was determined using NMR.

A film was then prepared of each blend on a blown film extruder i.e. Collin blown film extruder at a throughput of 12 kg/h, using proportions 25%-50%-25%, with a length to diameter ratio of 25, a die diameter of 50 mm, a die gap of 1.2 mm and a blow-up ratio (BUR) of 1.3-3.5 to make film "A" according to the invention. According to the same procedure, films "B", "C", "D" and "E" were made as comparisons, consisting only of EVA, LOPE and PLA, respectively. All films had a thickness of 100 μm. The properties measured for the films "A", "B", "C", "D" and "E" are provided in Table 2.

The coefficients of friction $\mu_s$ and $\mu_k$ were measured according to ASTM D 1494-02.

Elmendorf tear strength was measured in the machine direction (MD) and in the transverse direction (TD). These measurements were carried out according to ASTM D 1922

Dart impact strength was measured according to ASTM D 1709.

Measurements for tensile strength at yield in the machine direction (MD) and in the transverse direction (TD) were carried out according to ASTM D 882-02.

Gloss was measured according to ASTM D 2457 at an angle of 45°. Haze was measured according to ISO 14782.

Figure 1:
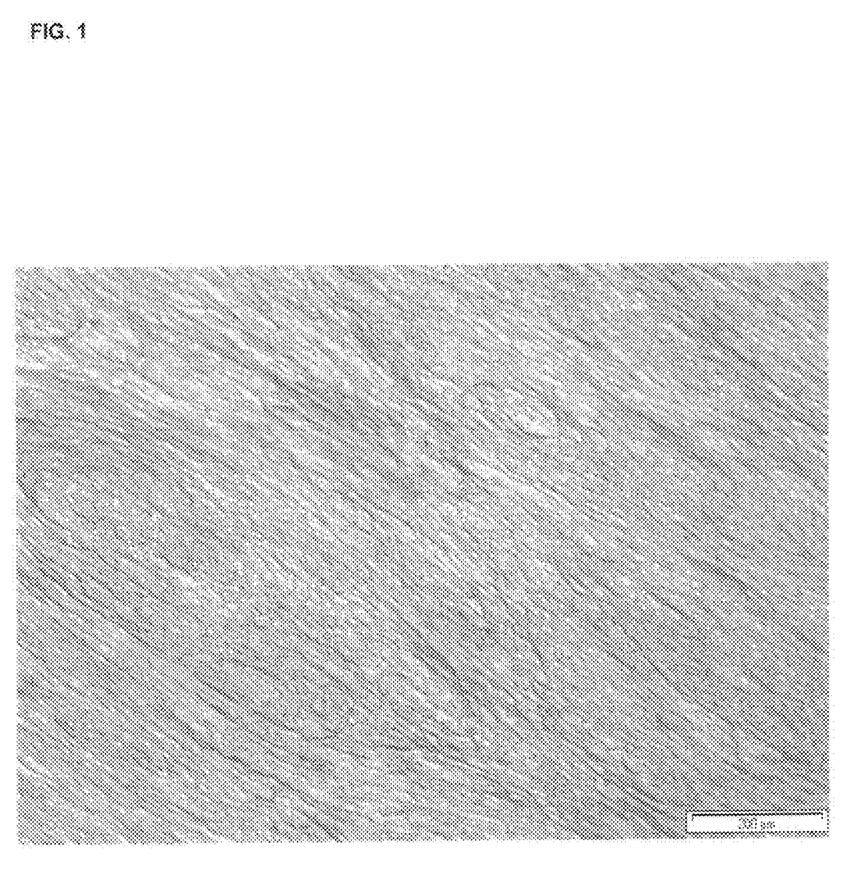
FIG. 1 is a scanning electron microscope (SEM) image of the surface of a film according to the invention, comprising pLDPE and PLA.
Figure 2:
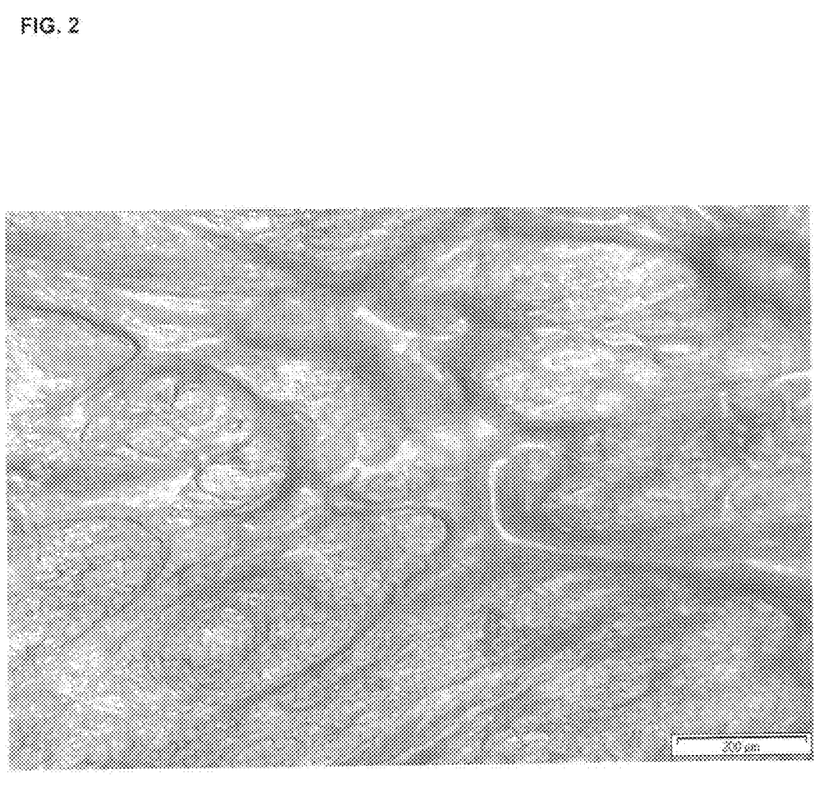
FIG. 2 is an SEM image of the surface of a film comprising LDPE and PLA.

It can be seen that the blends of PLA and polyethylene are compatible, the copolymer EVA being much more compatible with PLA than the homopolymer LDPE. FIGS. 1 and 2 show scanning electron microscope (SEM) images of the blends. FIGS. 1 and 2 are SEM images of the surface of the films "A" and "B", respectively. These figures show that films made of EVA and PLA blends are more homogeneous than the LDPE-containing equivalent.

From Table 2 it can also be noted that EVA can be used as a Dart impact strength modifier when blended with PLA i.e. Film "A" shows a higher dart impact strength than Film "B" comprising LDPE.

Tensile strengths of Film "A" are increased in comparison with 100% EVA Film "C".

In relation to one another, blend "A" comprising the EVA shows improved mechanical strengths, in particular Elmendorf tear strengths in the machine direction, compared to blend "B" comprising the LDPE.

In comparison with blend "B", blend "A" has a much lower haze percentage value. This indicates further that the compatibility of EVA with PLA is much higher than the compatibility of LDPE with PLA.

Film "A" also has better gas barrier properties towards oxygen and carbon dioxide than film "B" as measured according to ASTM D 1434.

It has also proven easier to print on film "A" than to print on film "B" due to film "A"'s increased surface tension.

The advantages of using resin compositions of polyethylene films comprising PLA are manifold. First and foremost, a part of the resin composition is replaced with a rapidly renewable resource, PLA. The amount of ethylene derived from petroleum sources required in the film can thus be diminished.

The presence of PLA in the resin composition also causes the final resin composition to be partially biodegradable and more importantly, compostable. Due to the more rapid compositing of PLA in the resin blend, the EVA that remains has a higher exposed surface area, so that this EVA will disintegrate faster than products made solely of EVA.

Furthermore, by blending PLA with EVA, a film having better mechanical properties than a film consisting of PLA alone can be achieved.

TABLE 2

|  | FILM A 80% EVA + 20% PLA | Comp Ex FILM B 80% LDPE + 20% PLA | Comp Ex FILM C 100% EVA | Comp Ex FILM D 100% LDPE | Comp Ex FILM E 100% PLA |
|---|---|---|---|---|---|
| Coefficient of friction |  |  |  |  |  |
| Static (μs) | 0.895 | 0.571 | N/A* | 1.156 | 5.12 |
| Kinetic (μk) | 0.950 | 0.537 | N/A* | 1.454 | 2.69 |
| Mechanical properties |  |  |  |  |  |
| Elmendorf MD/N/mm | 7.49 | 2.49 | 40.04 | 33.09 | 3.07 |
| Elmendorf TD/N/mm | 20.91 | 22.15 | 53.37 | 59.29 | 3.15 |
| Dart/g/μm | 5.24 | 0.15 | 9.16 | 2.59 | 0.63 |
| Tensile at yield MD/ N/mm | 10.71 | 14.51 | 5.08 | 11.33 | 73 |
| Tensile at yield TD/ N/mm | 8.82 | 10.83 | 4.82 | 11.40 | 59 |
| Optics |  |  |  |  |  |
| Gloss | 23.1 | 14 | 75.3 | 71.5 | N/A |
| Haze | 47 | 73.7 | 2.6 | 7.6 | 0.8 |

N/A = not applicable
*the coefficient of friction could not be measured for the EVA film due to its sticky surface.

The invention claimed is:

1. A resin composition comprising at least 0.1% but less than 50% by weight of poly(hydroxy carboxylic acid) and at least 50% by weight of polar low density polyethylene (pLDPE), the pLDPE comprising from 0.5 to 25% by weight of one or more polar vinyl-containing comonomers, wherein the poly(hydroxy carboxylic acid) has a formula of:

Formula I wherein R9 is hydrogen or a branched or linear alkyl comprising from 1 to 12 carbon atoms;

wherein R10 is optional, but if present comprises branched, cyclic, or linear alkylene chains comprising from 1 to 12 carbon atoms; and wherein "r" represents a number of repeating units of R and is any integer from 30 to 15000.

2. The composition of claim 1, wherein the resin composition is free of compatibiliser for compatibilising pLDPE and poly(hydroxy carboxylic acid).

3. The composition of claim 1, wherein the comonomer of the pLDPE is selected from one or more of: acrylates, methyl acrylate, ethyl acrylate, n-butyl acrylate, 2-ethylhexyl acrylate and tert-butyl acrylate; methacrylates, methacrylic acid, methyl methacrylate, ethyl methacrylate, n-butyl methacrylate and tert-butyl methacrylate; ethyl acrylates, ethyl acrylic acid, methyl ethyl acrylate, diethyl acrylate, n-butyl ethyl acrylate and tert-butyl ethyl acrylate; vinyl esters, vinyl acetate, unsaturated dicarboxylic acids, maleic acid, unsaturated dicarboxylic acid derivatives, maleic anhydride, alkylimides of maleic acid, and N-methylmaleimide.

4. The composition of claim 1, wherein the poly(hydroxy carboxylic acid) is poly(lactic acid) and is a copolymer having a comonomers chosen from one or more of: aliphatic hydroxy carboxylic acids other than lactic acid, glycolic acid, 3-hydroxybutyric acid, 4-hydroxybutyric acid, 4-hydroxyvaleric acid, 5-hydroxyvaleric acid, 6-hydroxycaproic acid, aliphatic polyesters of dihydric alcohols, and dibasic carboxylic acids.

5. The composition of claim 1, wherein the pLDPE has from 0.5 up to 25 wt % of a polar comonomer comprising a polymerisable carbon-carbon double bond.

6. The composition of claim 1, wherein the comonomer is further comprised of a second poly(hydroxy carboxylic acid) that is different from a one other poly(hydroxy carboxylic acid), and wherein the second poly(hydroxy carboxylic acid) also has the Formula I structure.

7. The composition of claim 1, wherein the poly(hydroxy carboxylic acid) and one or more polar vinyl-containing comonomers react together to form aliphatic esters, oligoesters, or polyesters, each having a free hydroxyl end group and a free carboxylic acid end group that are capable of reacting with hydroxy carboxylic acids, and wherein the reacted comonomers have a formula of:

Formula II wherein R11 is a branched or linear alkylene comprising from 1 to 12 carbon atoms;

wherein R12 is a branched or linear alkylene comprising from 1 to 12 carbon atoms, and wherein R11 and R12 are the same, or different;

and wherein "t" represents the number of repeating units T and is any integer of at least 1.

8. The composition of claim 1, wherein a part of the resin composition is replaced with poly(lactic acid) comprising a renewable resource, and wherein an amount of ethylene derived from required petroleum sources can thereby be diminished, and wherein the presence of poly(lactic acid) in the resin composition causes a final resin composition to be partially biodegradable and compostable.

9. The composition of claim 1, wherein films formed from polymer blends of the resin composition exhibit increased tensile strengths relative to films of LDPE without the resin composition.

10. The composition of claim 1, wherein films formed from the resin composition have improved printability in comparison to films consisting only of low density ethylene copolymer due to a higher surface tension of poly(hydroxy carboxylic acid)s.

11. The composition of claim 1, wherein films formed from the resin composition have increased thermal and high frequency sealability in comparison to LDPE films made without the resin composition.

12. The composition of claim 1, wherein films formed from the resin composition have increased stiffness of the film and provide an enhanced water breathability in comparison to LDPE films made without the resin composition.

13. The composition of claim 1, wherein films formed from the resin composition have improved barrier properties against atmospheric gases comprised of oxygen, carbon dioxide and nitrogen in comparison to films comprised of poly (lactic acid), but without LDPE.

14. A resin composition comprising at least 0.1% but less than 50% by weight of poly(hydroxy carboxylic acid) and at least 50% by weight of polar low density polyethylene (pLDPE), the pLDPE comprising from 0.5 to 25% by weight of one or more polar vinyl-containing comonomers, wherein the poly(hydroxy carboxylic acid) has a formula of:

Formula I wherein R9 is hydrogen or a branched or linear alkyl comprising from 1 to 12 carbon atoms;

wherein R10 is optional, but if present comprises branched, cyclic, or linear alkylene chains comprising from 1 to 12 carbon atoms; and wherein "r" represents a number of repeating units of R and is any integer from 30 to 15000;
wherein the resin composition is further comprised of EVA and wherein the resin composition also comprised of EVA will disintegrate faster than products consisting of EVA;
wherein the resin is suitable for end use applications selected from film manufacturing, cast films, blown films, uni-oriented films, bi-oriented films, thermoforming, foaming applications, heat seal applications, blow molding, injection and/or stretch blow molding, extrusion blow molding, rotational molding, and combinations thereof.

15. A resin composition comprising at least 0.1% but less than 50% by weight of poly(hydroxy carboxylic acid) and at least 50% by weight of polar low density polyethylene (pLDPE), the pLDPE comprising from 0.5 to 25% by weight of one or more polar vinyl-containing comonomers, wherein the poly(hydroxy carboxylic acid) has a formula of:

Formula I wherein R9 is hydrogen or a branched or linear alkyl comprising from 1 to 12 carbon atoms;

wherein R10 is optional, but if present comprises branched, cyclic, or linear alkylene chains comprising from 1 to 12 carbon atoms; and wherein "r" represents a number of repeating units of R and is any integer from 30 to 15000;

wherein the resin composition is further comprised of EVA and wherein a film with EVA has better mechanical properties than a film without EVA;

wherein the resin is suitable for end use applications selected from film manufacturing, cast films, blown films, uni-oriented films, bi-oriented films, thermoforming, foaming applications, heat seal applications, blow molding, injection and/or stretch blow molding, extrusion blow molding, rotational molding, and combinations thereof.

16. The composition of claim 1, wherein the pLDPE comprises an ethylene-vinyl-acetate (EVA) copolymer.

* * * * *